US009823776B2

(12) United States Patent
Kida et al.

(10) Patent No.: US 9,823,776 B2
(45) Date of Patent: Nov. 21, 2017

(54) ELECTRONIC APPARATUS AND METHOD OF CONTROLLING THE SAME

(71) Applicant: Japan Display Inc., Minato-ku (JP)

(72) Inventors: Yoshitoshi Kida, Tokyo (JP); Jouji Yamada, Tokyo (JP); Hirofumi Nakagawa, Tokyo (JP); Michio Yamamoto, Tokyo (JP); Kohei Azumi, Tokyo (JP); Makoto Hayashi, Tokyo (JP); Hiroshi Mizuhashi, Tokyo (JP); Kozo Ikeno, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/398,179

(22) Filed: Jan. 4, 2017

(65) Prior Publication Data

US 2017/0115815 A1    Apr. 27, 2017

Related U.S. Application Data

(63) Continuation of application No. 14/186,431, filed on Feb. 21, 2014, now Pat. No. 9,576,549.

(30) Foreign Application Priority Data

Mar. 29, 2013 (JP) .................................. 2013-073873

(51) Int. Cl.
G06F 3/041 (2006.01)
G06F 3/044 (2006.01)

(52) U.S. Cl.
CPC ............ *G06F 3/0416* (2013.01); *G06F 3/044* (2013.01); *G06F 2203/04101* (2013.01)

(58) Field of Classification Search
CPC ....... G06F 3/0416; G09G 3/041–3/047; G09G 5/003

(Continued)

(56) References Cited

U.S. PATENT DOCUMENTS

2009/0095540 A1* 4/2009 Zachut .................... G06F 3/044
                                                            178/18.03
2010/0182273 A1    7/2010 Noguchi et al.
(Continued)

FOREIGN PATENT DOCUMENTS

CN       101893955 A       11/2010
CN       102081482 A        6/2011
(Continued)

OTHER PUBLICATIONS

Office Action dated Aug. 4, 2015 in Japanese Patent Application No. 2013-073873 (with English translation).

(Continued)

*Primary Examiner* — Michael Pervan
(74) *Attorney, Agent, or Firm* — Oblon, McClelland, Maier & Neustadt, L.L.P.

(57) ABSTRACT

According to one embodiment, an electronic apparatus, includes a sensor-equipped display device includes a display device and a sensor configured to detect a contact or proximate position, a display driver configured to output an image display signal to the display device and to output a drive signal to the sensor, a detecting circuit configured to generate, based on the information from the sensor, raw data (Raw data) including three-dimensional information of coordinates of a position on the display device and a physical quantity at the coordinates, and an application processor configured to discriminate whether a part of the region in the display area should be further sensed or not, based on the raw data, and if the part of the region is further sensed, to output the range of the display device to be further sensed and the timing of driving the sensor to the display driver.

17 Claims, 7 Drawing Sheets

(58) Field of Classification Search
USPC .................. 178/18.01–19.07; 345/173–178
See application file for complete search history.

(56) References Cited

U.S. PATENT DOCUMENTS

| | | |
|---|---|---|
| 2011/0187677 A1 | 8/2011 | Hotelling |
| 2012/0044167 A1 | 2/2012 | Nakanishi et al. |
| 2012/0044180 A1 | 2/2012 | Matsu |
| 2012/0050217 A1 | 3/2012 | Noguchi et al. |
| 2012/0200494 A1 | 8/2012 | Perski et al. |
| 2013/0050116 A1 | 2/2013 | Shin |

FOREIGN PATENT DOCUMENTS

| | | |
|---|---|---|
| CN | 102112951 | 6/2011 |
| CN | 102375606 A | 3/2012 |
| CN | 102955611 A | 3/2013 |
| JP | 2003-329997 A | 11/2003 |
| JP | 2009-244958 | 10/2009 |
| JP | 2009-540375 | 11/2009 |
| JP | 2011-28721 | 2/2011 |
| JP | 2012-43394 | 3/2012 |
| JP | 2012-48295 | 3/2012 |
| JP | 2013-45209 A | 3/2013 |
| JP | 2013-45466 | 3/2013 |
| TW | 201234240 A1 | 8/2012 |
| TW | 201308149 A1 | 2/2013 |
| WO | WO 2011/048840 A1 | 4/2011 |
| WO | WO 2011/075270 A2 | 6/2011 |

OTHER PUBLICATIONS

Combined Taiwanese Office Action and Search Report dated Oct. 14, 2015 in Patent Application No. 103108510 (with English Translation).

Office Action dated Jul. 4, 2016 in Chinese Patent Application No. 201410119328.5 (with English Translation).

Office Action dated Sep. 27, 2016, in Japanese Patent Application No. 2015-242298 (with English language translation).

* cited by examiner

ELECTRONIC APPARATUS AND METHOD OF CONTROLLING THE SAME

CROSS-REFERENCE TO RELATED APPLICATIONS

This application is a continuation of and claims the benefit of priority from U.S. patent application Ser. No. 14/186,431, filed Feb. 21, 2014, which claims the benefit of priority from Japanese Patent Application No. 2013-073873, filed Mar. 29, 2013, the entire contents of which are incorporated herein by reference.

FIELD

Embodiments described herein relate generally to an electronic apparatus and a method of controlling the same.

BACKGROUND

Cellphones, smartphones, tablet terminals, notebook-type personal computers, etc. have been widespread. Such an electronic apparatus comprises an input panel integrated with a display panel. When a user touches, for example, a display screen, the input panel detects the touched position. The input panel comprises, for example, a sensor configured to detect variation in capacitance.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, there is provided an electronic apparatus, comprising:

a sensor-equipped display device comprising a display device and a sensor configured to output information to detect a contact or proximate position on the display device;

a display driver configured to output an image display signal to the display device and to output a drive signal to the sensor;

a detecting circuit configured to output a range on the display device sensed by the sensor and timing of driving the sensor to the display driver, and to generate, based on the information from the sensor, raw data (Raw data) including three-dimensional information of coordinates of a position on the display device and a physical quantity at the coordinates; and an application processor configured to output graphic data to be displayed on the display device based on the raw data generated by the detecting circuit, to the display driver, to discriminate whether a part of the region in the display area should be further sensed or not, based on the raw data generated by the detecting circuit, and if the part of the region is further sensed, to output the range of the display device to be further sensed and the timing of driving the sensor to the display driver.

The electronic apparatus and a method of controlling the electronic apparatus, according to the embodiment, will be described hereinafter with reference to the accompanying drawings.

Figure 1:
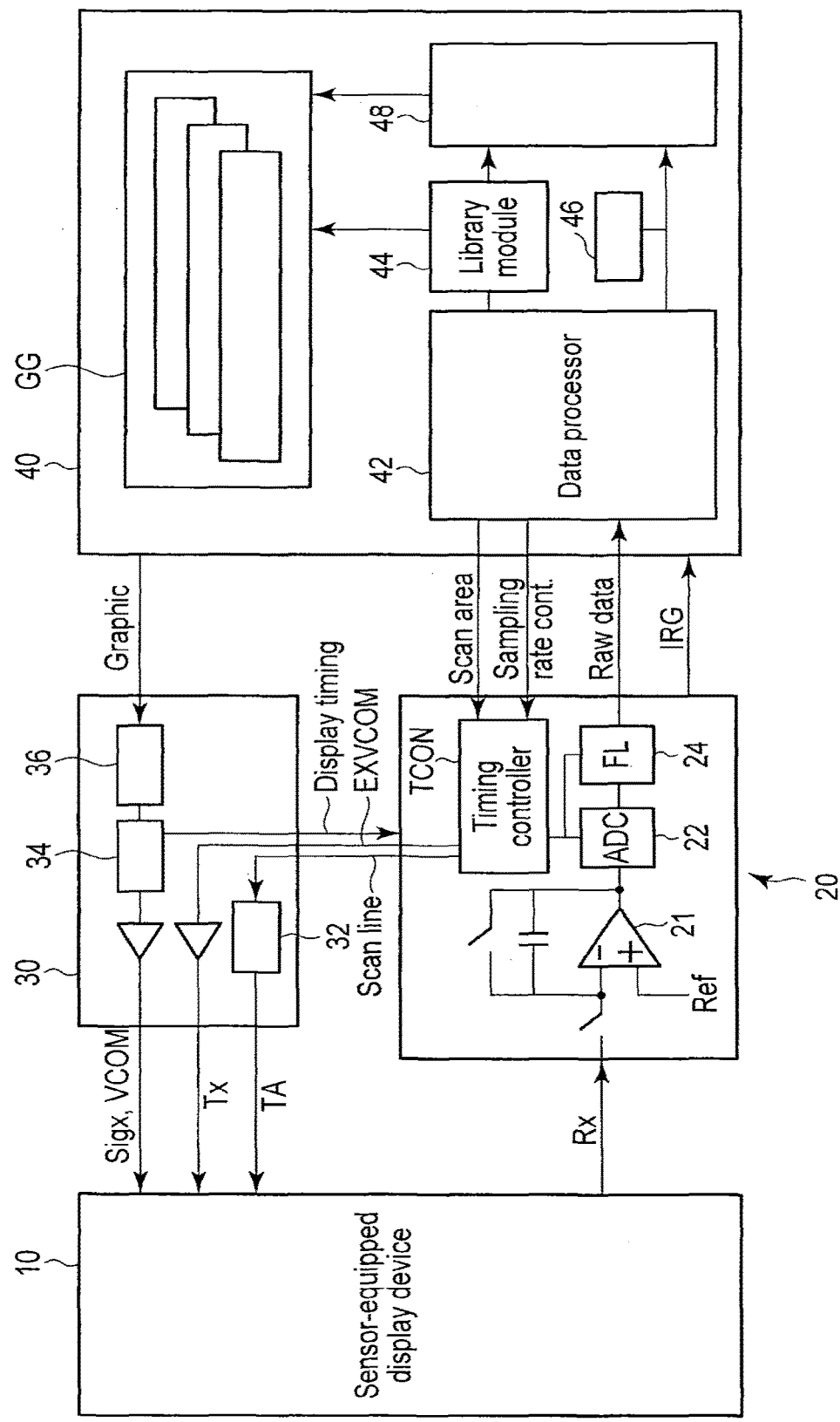
FIG. 1 is a block diagram schematically showing a structural example of an electronic apparatus according to an embodiment.

FIG. 1 is a block diagram schematically showing a structural example of the electronic apparatus according to the embodiment.

The electronic apparatus of the present embodiment comprises a sensor-equipped display device 10, a detecting circuit 20, a display driver 30 and an application processor 40.

The sensor-equipped display device 10 comprises a display device and a sensor. The sensor-equipped display device 10 outputs sensor detection value Rx to the detecting circuit 20, displays an image, based on image display signal Sigx received from the display driver 30, and drives the sensor, based on sensor drive signal Tx.

The detecting circuit 20 generates raw data (Raw data) by converting the detection value Rx received from the sensor-equipped display device 10 into a digital signal, and outputs the data to the application processor 40.

In addition, the detecting circuit 20 outputs control signal EXVCOM to control drive timing of the sensor to the display driver 30, based on a sampling rate and a scan area signal received from the application processor 40.

The detecting circuit 20 comprises an integrating circuit 21, an A/D converter 22, a filter 24, and a timing controller TCON.

The integrating circuit 21 converts capacitance between an electrode pattern (Tx) of a common electrode CE and an electrode pattern (Rx) of a detecting electrode SE, into a voltage, and outputs the voltage to the A/D converter 22.

The A/D converter 22 samples an integrated value received from the integrating circuit 21 at predetermined timing, converts the integrated value into a digital signal, and outputs the digital signal to the filter 24. The sampling timing of the A/D converter 22 is controlled by the timing controller TCON.

The filter 24 includes, for example, a digital filter such as an FIR filter. In computation of the filter 24, for example, a coefficient transmitted from the application processor 40 is used. The filter 24 outputs a value obtained after the computation to the application processor 40 as raw data (Raw data). In other words, raw data (Raw data) is digital data obtained by removing noise from the sensor detection value Rx.

Figure 8:
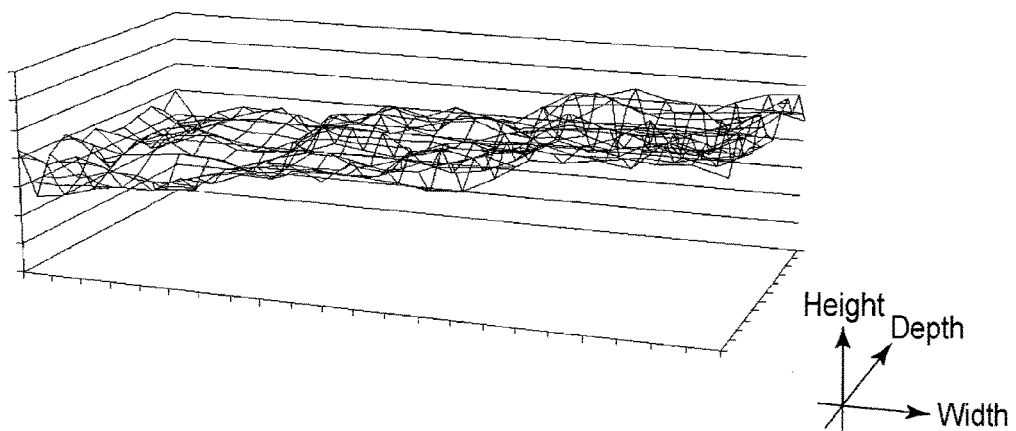
FIG. 8 is a view illustrating an example of sensor detection value Rx input in a comparator of a sensor processor.
Figure 9:
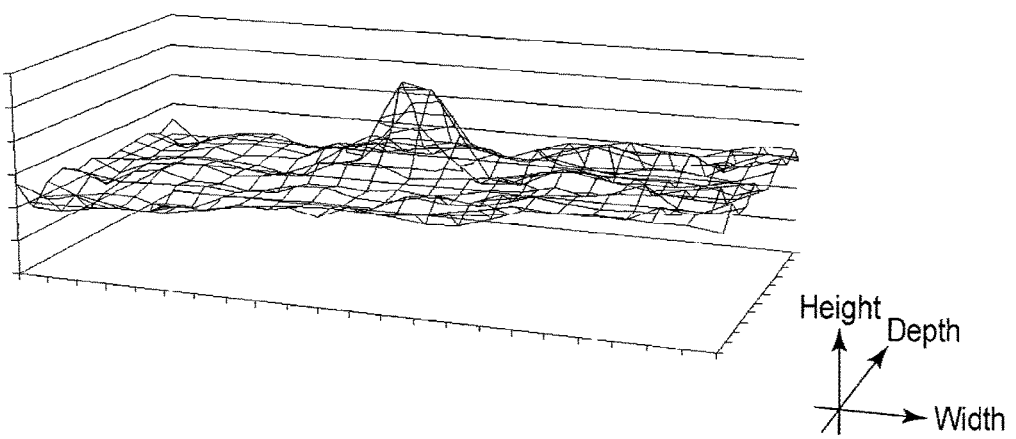
FIG. 9 is a view illustrating an example of sensor detection value Rx input in the comparator of the sensor processor.

FIG. 8 and FIG. 9 show examples of the sensor detection value Rx input to the integrating circuit 21. FIG. 8 shows an example of the sensor detection value Rx input when a user's finger, etc. are not in proximity of the sensor. FIG. 9 shows an example of the sensor detection value Rx input when a user's finger, etc. are in proximity of the sensor.

The sensor detection value Rx received by the integrating circuit 21 is an output value of the detecting electrode SE, which is output when the sensor drive signal Tx is supplied to each electrode pattern (or electrode pattern group) of the common electrode CE, and is three-dimensional information including information such as coordinates of a position at which the electrode pattern (or electrode pattern group) of the common electrode CE and the electrode pattern of the detecting electrode SE intersect and a physical quantity (i.e., inter-electrode capacitance value or detecting electrode voltage) at the position.

In FIG. 8 and FIG. 9, the sensor detection value Rx is plotted by taking the positional coordinates in a width direction and a depth direction and taking the physical quantity in a height direction.

Figure 10:
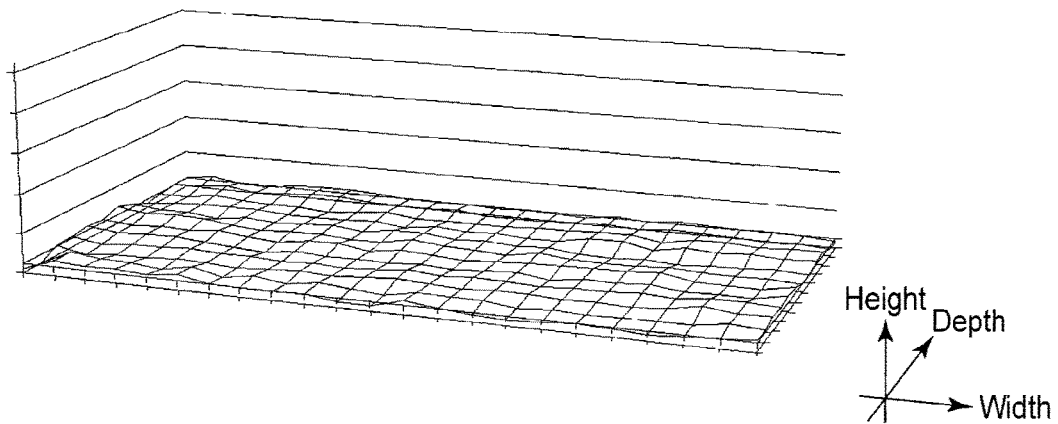
FIG. 10 is a view illustrating an example of raw data (Raw data) output from the sensor processor.
Figure 11:
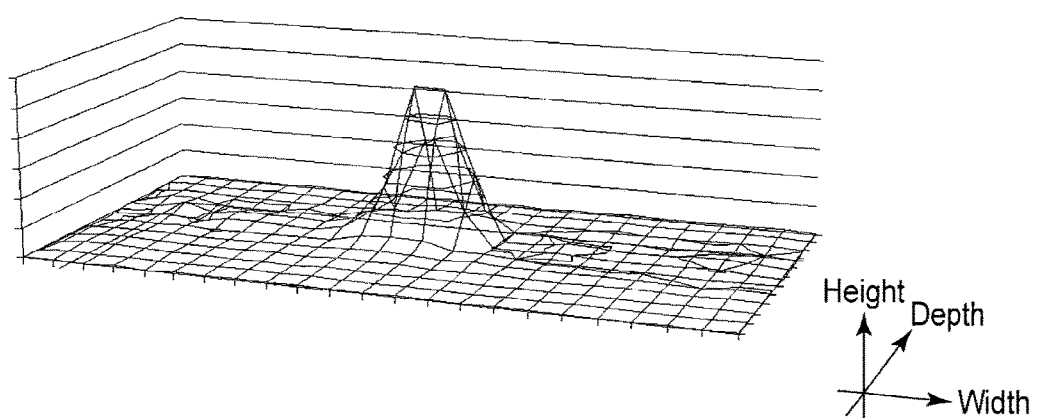
FIG. 11 is a view illustrating an example of raw data (Raw data) output from the sensor processor.

FIG. 10 and FIG. 11 show examples of the raw data (Raw data) output from the detecting circuit 20.

FIG. 10 shows an example of the raw data (Raw data) output when a user's finger, etc. are not in proximity of the sensor. FIG. 11 shows an example of the raw data (Raw data) output when a user's finger, etc. are in proximity of the sensor.

Similarly to the sensor detection value Rx, the raw data (Raw data) output from the filter 24 of the detecting circuit 20 is three-dimensional information including information such as coordinates of a position at which the electrode pattern (or electrode pattern group) of the common electrode CE and the electrode pattern of the detecting electrode SE intersect and a physical quantity (i.e., inter-electrode capacitance value or detecting electrode voltage) at the position. The raw data (Raw data) is processed such that positions of the user's finger, etc. can be represented more remarkably by removing a noise component from the sensor detection value Rx.

In FIG. 10 and FIG. 11, the raw data (Raw data) is plotted by taking the positional coordinates in a width direction and a depth direction and taking the physical quantity in a height direction.

The timing controller TCON receives a scan area signal (Scan area) and a sampling rate control signal (Sampling rate cont.) from the application processor 40, and receives a display timing signal (Display timing) from the display driver 30.

The timing controller TCON outputs a sampling signal to the A/D converter 22 and the filter 24, based on the sampling rate control signal (Sampling rate cont.) and the display timing signal (Display timing). Thus, image display timing of the display device 10 and a sampling operation of the sensor are synchronized with each other. The timing controller ICON outputs a scan line signal (Scan line) indicating a drive line position based on the scan area signal.

The scan line signal (Scan line) includes information such as an identification value of a driving electrode pattern, of the electrode patterns of the common electrode CE and a drive unit (one or more lines) or a thinning interval (one or more lines).

In addition, the timing controller ICON generates sensor drive timing signal EXVCOM, based on the sampling rate control signal (Sampling rate cont.) and the display timing signal (Display timing), and outputs the sensor drive timing signal EXVCOM to the display 30. The image display timing and the sensor drive timing are therefore synchronized with each other.

The display driver 30 processes graphic data (Graphic) received from the application processor 40 such that the data can be displayed by the display device, and outputs the image display signal Sigx and a common voltage VCOM. In addition, the display driver 30 outputs the sensor drive signal Tx, based on the sensor drive timing signal EXVCOM received from the detecting circuit 20.

The display driver 30 comprises a sensor drive signal distributing circuit 32, a memory 36 and a D/A converter 34.

The sensor drive signal distributing circuit 32 receives the scan line signal from the detecting circuit 20, and outputs a driving electrode signal TA to set the number of drive lines and a pattern electrode configured to apply the sensor drive signal Tx.

The memory 36 comprises recording means such as a line memory and a video random access memory (VRAM). The graphic data (Graphic) output from the application processor 40 is stored in the memory 36.

The D/A converter 34 reads the graphic data (Graphic) stored in the memory 36, at predetermined timing, and outputs the common voltage VCOM and the image signal Sigx obtained by converting the graphic data (Graphic) into an analog signal. The output signal of the D/A converter 34 is output to the sensor-equipped display device 10 via a buffer.

In addition, the display driver 30 outputs the sensor drive timing signal EXVCOM received from the detecting circuit 20, to the sensor-equipped display device 10 via a buffer.

The application processor 40 executes various processing using the raw data (Raw data) received from the detecting circuit 20, detects input information on positions of a user's fingertip and a tip of a stylus, etc. and generates graphic data (Graphic) of the image displayed on the sensor-equipped display device 10 based on, for example, the detected input information such as coordinates of a user's fingertip and a tip of a stylus.

The application processor 40 comprises a data processor 42, a library module 44, a Gesture generator 46, a software module 48, and a graphic generator GG.

The data processor 42 receives the raw data (Raw data) from the detecting circuit 20, computes and outputs the positions of the user's fingertip and the tip of the stylus, etc., generates three-dimensional image data from the received raw data (Raw data), and outputs the generated image data.

The library module 44 receives the three-dimensional image data output from the data processor 42, detects the input information on user's movement, the coordinates of the position of the user's fingertip, etc. based on, for example, pre-stored data, and outputs the identification information (Coordinate/ID/Attribute/Gesture) of the movement and the coordinates.

The Gesture generator 46 receives the coordinates of the position of the user's fingertip, etc. from the data processor 42, determines the user's movement from time variation in the coordinates, and outputs the identification information (Coordinate/ID/Attribute/Gesture) of the movement and the coordinates.

The software module 48 receives the input information such as the identification information (Coordinate/ID/Attribute/Gesture) of the movement and the coordinates, from the library module 44 and the Gesture generator 46, and outputs an image signal indicating a position, a color, etc. of the image displayed on the display device 10 by using values of the input information, to the graphic generator GG.

The graphic generator GG generates the graphic data (Graphic) based on the signal received from the software module 48, and outputs the data to the display driver 30.

Figure 2:
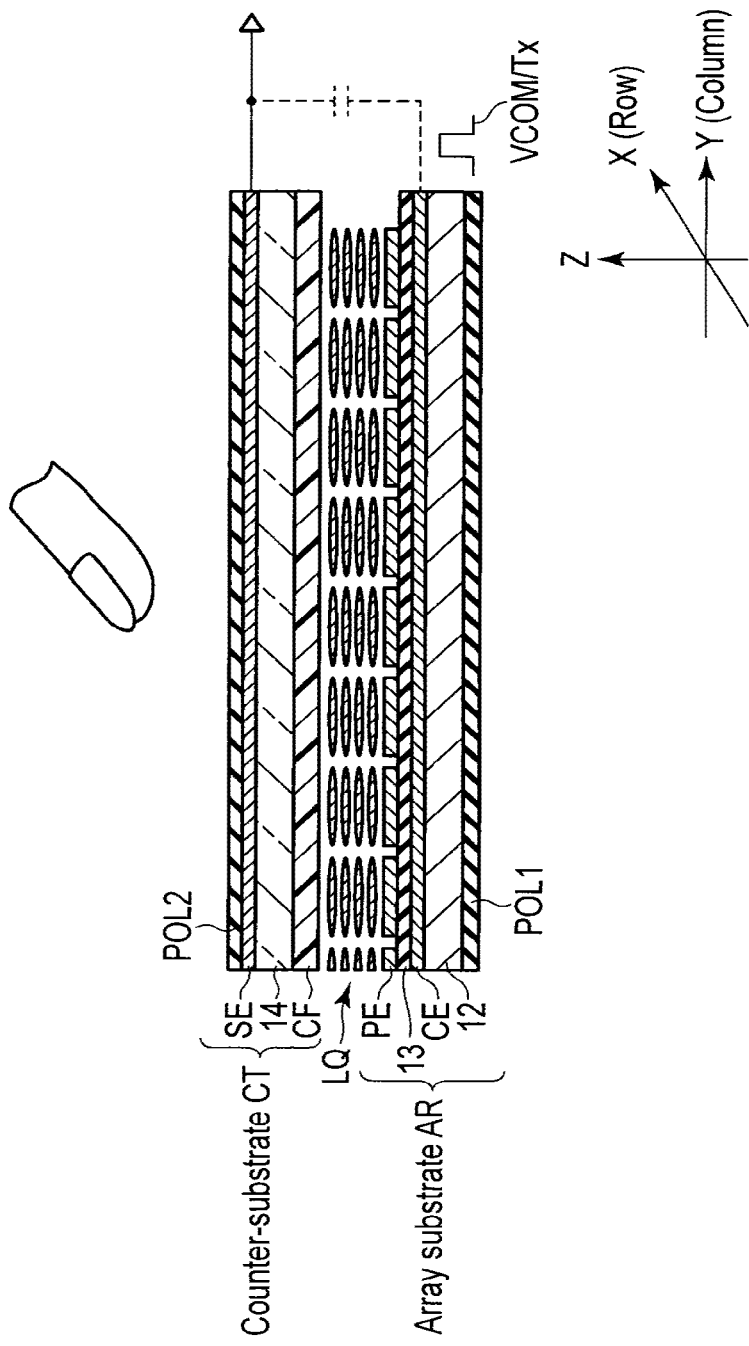
FIG. 2 is a cross-sectional view schematically showing a structural example of a sensor-equipped display device shown in FIG. 1.

FIG. 2 is a cross-sectional view schematically showing a structural example of the sensor-equipped display device shown in FIG. 1. In FIG. 2, a first direction X and a second direction Y are substantially orthogonal to each other. In FIG. 2, a third direction Z is substantially orthogonal to a plane defined by the first direction X and the second direction Y.

In the sensor-equipped display device 10, a liquid crystal display device is employed as the display device, and a capacitive sensor is constituted by using a display drive signal (common voltage VCOM to be described later) and a part of an electrode (common electrode CE to be described later) originally provided on the liquid crystal display device.

The sensor-equipped display device 10 comprises an array substrate AR, a counter-substrate CT, and a liquid crystal layer LQ held between the array substrate AR and the counter-substrate CT.

The array substrate AR comprises a first polarizing plate POL1, a TFT substrate 12, common electrodes CE, and pixel electrodes PE.

The TFT substrate 12 comprises a transparent insulating substrate of glass, etc., switching elements (not shown), various wiring lines such as source lines and gate lines, and a planarizing layer which is an insulating film covering these members. The switching elements are arrayed in a matrix having the first direction X as a row direction and the second direction Y as a columnar direction, to switch connection between the source lines and the pixel electrodes PE in accordance with a signal supplied to the gate lines.

The common electrodes CE are disposed on the TFT substrate 12 and covered with an insulating layer 13. For example, the common electrodes CE are extended in the first direction X and are aligned in the second direction Y. The common electrodes CE are formed of a transparent electrode material such as indium tin oxide (ITO) or indium zinc oxide (IZO). In the present embodiment, the common electrodes CE are also employed as sensor driving electrodes.

The pixel electrodes PE are disposed on the insulating film 13 and covered with an alignment film (not shown). The pixel electrodes PE are arrayed in a matrix having the first direction X as a row direction and the second direction Y as a columnar direction. The pixel electrodes PE in a plurality of columns are opposite to one of the common electrodes CE via the insulating layer 13. The pixel electrodes PE are formed of a transparent electrode material such as ITO or IZO.

The first polarizing plate POL1 is disposed on a main surface at an outside (opposite to the common electrodes CE) of the TFT substrate 12.

The counter-substrate CT comprises a transparent insulating substrate 14 formed of glass, etc., a color filter CF, detecting electrodes SE, and a second polarizing plate POL2.

The color filter CF is arranged to cover a black matrix (not shown) arranged in lattice on the transparent insulating substrate 14. The color filter CF comprises, for example, a plurality of colored layers, and the colored layers of the color filter CF arranged in the pixels adjacent in the first direction X, respectively, are different in color from each other. For example, the color filter CF comprises colored layers formed of resin materials which are colored in three primary colors of light, i.e., red, blue and green, respectively. A red-colored filter (not shown) formed of the resin material colored in red is arranged to correspond to a red pixel. A blue-colored filter (not shown) formed of the resin material colored in blue is arranged to correspond to a blue pixel. A green-colored filter formed of the resin material colored in green is arranged to correspond to a green pixel. Boundaries of the colored layers are positioned to overlap the black matrix. The color filter CF is covered with an overcoat layer (not shown). The overcoat layer relaxes an influence of roughness on a surface of the color filter. The overcoat layer is covered with an alignment film (not shown).

The detecting electrodes SE are disposed on a main surface at an outside (opposite to the color filter CF) of the transparent insulating substrate 14. The detecting electrodes SE are extended in a direction (second direction Y) substantially orthogonal to the direction (first direction X) of extension of the common electrodes CE, and are aligned in the first direction X. The detecting electrodes SE are formed of a transparent electrode material such as ITO or IZO.

The second polarizing plate POL2 is disposed on the detecting electrodes SE (i.e., at a side opposite to the color filter CF of the transparent insulating substrate 14). A first polarization axis of the first polarizing plate POL1 and a second polarization axis of the second polarizing plate POL2 have a positional relationship (cross-Nicol) of being, for example, orthogonal to each other. At this time, for example, one of the polarizing plates is arranged such that the polarization axis of the polarizing plate is parallel or orthogonal to an initial alignment direction of liquid crystal molecules.

Figure 3:
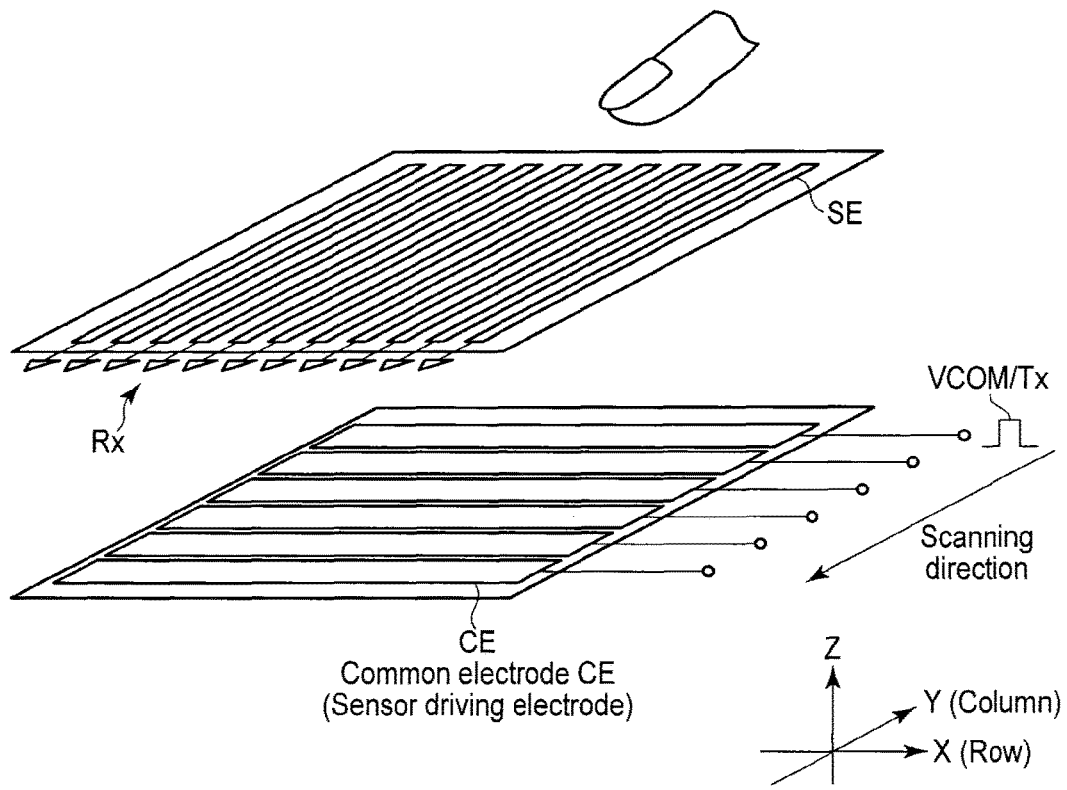
FIG. 3 is a perspective view illustrating a structural example of a common electrode and a detecting electrode of the sensor-equipped display device shown in FIG. 2.

FIG. 3 is a perspective view illustrating a structural example of the common electrode CE and the detecting electrode SE of the sensor-equipped display device shown in FIG. 2.

In this example, the common electrode CE is divided into a plurality of stripe-shaped electrode patterns extending in the first direction X (i.e., lateral orientation of the figure). When the image signal is written, the common voltage VCOM is supplied sequentially, by a driver, to the electrode patterns, which are subjected to sequential scan driving in time division. In addition, when the sensor is driven, the drive signal Tx is supplied sequentially to the electrode patterns by the display driver 30.

Alternately, the drive signal Tx is distributed to the electrode patterns in accordance with the scan line signal, such that some of the electrode patterns are scanned sequentially.

At this time, for example, the electrode patterns of the common electrode CE may be scanned in each line or may be scanned in every two or more lines. When the electrode patterns are driven simultaneously, for example, the drive signal Tx is distributed simultaneously to the electrode patterns in accordance with the scan line signal.

Furthermore, adjacent electrode patterns of the common electrode CE may be scanned sequentially or the electrode patterns may be scanned in every one or more lines. When the electrode patterns are driven while thinning one or more electrode patterns, for example, the drive signal Tx is distributed to the driving electrode pattern, of the electrode patterns, in accordance with the scan line signal.

On the other hand, the detecting electrode SE is composed of a plurality of stripe-shaped electrode patterns extending in a direction orthogonal to the direction of extension of the electrode patterns of the common electrode CE. The sensor detection value Rx is output from each of the electrode patterns of the detecting electrode SE and is input to the detecting circuit 20 shown in FIG. 1.

In the present embodiment, the detecting circuit 20 and the display driver 30 are synchronized with each other, and the image display driving and the sensor driving are executed in time division in the sensor-equipped display device 10.

The display driver 30 applies pulses of the sensor drive signal Tx to one or more electrode patterns of the common electrode CE during a sensor drive period. The detecting circuit 20 synchronizes with the sensor drive signal Tx, and obtains the sensor detection value Rx by sensing all of the electrode patterns of the detecting electrode SE.

Figure 4:
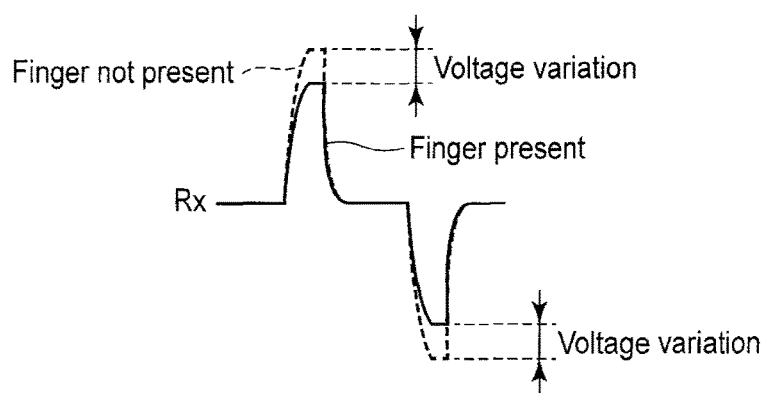
FIG. 4 is a graph illustrating examples of a drive signal and a detected signal of a capacitive sensor.

FIG. 4 is a graph illustrating examples of a drive signal and a detected signal of a capacitive sensor.

The capacitive sensor comprises a pair of electrodes (common electrode CE and detecting electrode SE) arranged to face each other and a dielectric held between the pair of electrodes, and constitutes a first capacitive element.

The first capacitive element has one end connected to an alternate signal source and has the other end connected to the detecting circuit 20 shown in FIG. 1. When an alternate rectangular wave (drive signal Tx) of a predetermined frequency (in a range between, for example, some kHz and some hundreds of kHz) is applied from the alternate signal source to the common electrode CE (one end of the capacitive element), an output waveform (sensor detection value Rx) shown in FIG. 4 appears at the detecting electrode SE (other end of the first capacitive element).

When the finger is present in proximity of the capacitive sensor, a capacitance between the electrode pattern of the common electrode CE and the electrode pattern of the detecting electrode SE decreases at a position corresponding to the finger. An amplitude (voltage variation) of the sensor detection value Rx in the electrode pattern of the detecting electrode SE at a position where the finger is present in proximity becomes small as compared with a position where the finger is not present in proximity. Whether the finger is in proximity or not can be therefore determined depending on whether the voltage variation is equal to or greater than a predetermined magnitude or not.

A method of discriminating whether the finger is in contact with the sensor or not has been described above. However, since the sensor detection value Rx is varied in a state in which the finger is not in contact with the sensor, a hovering detection, etc. can also be employed.

Figure 5:
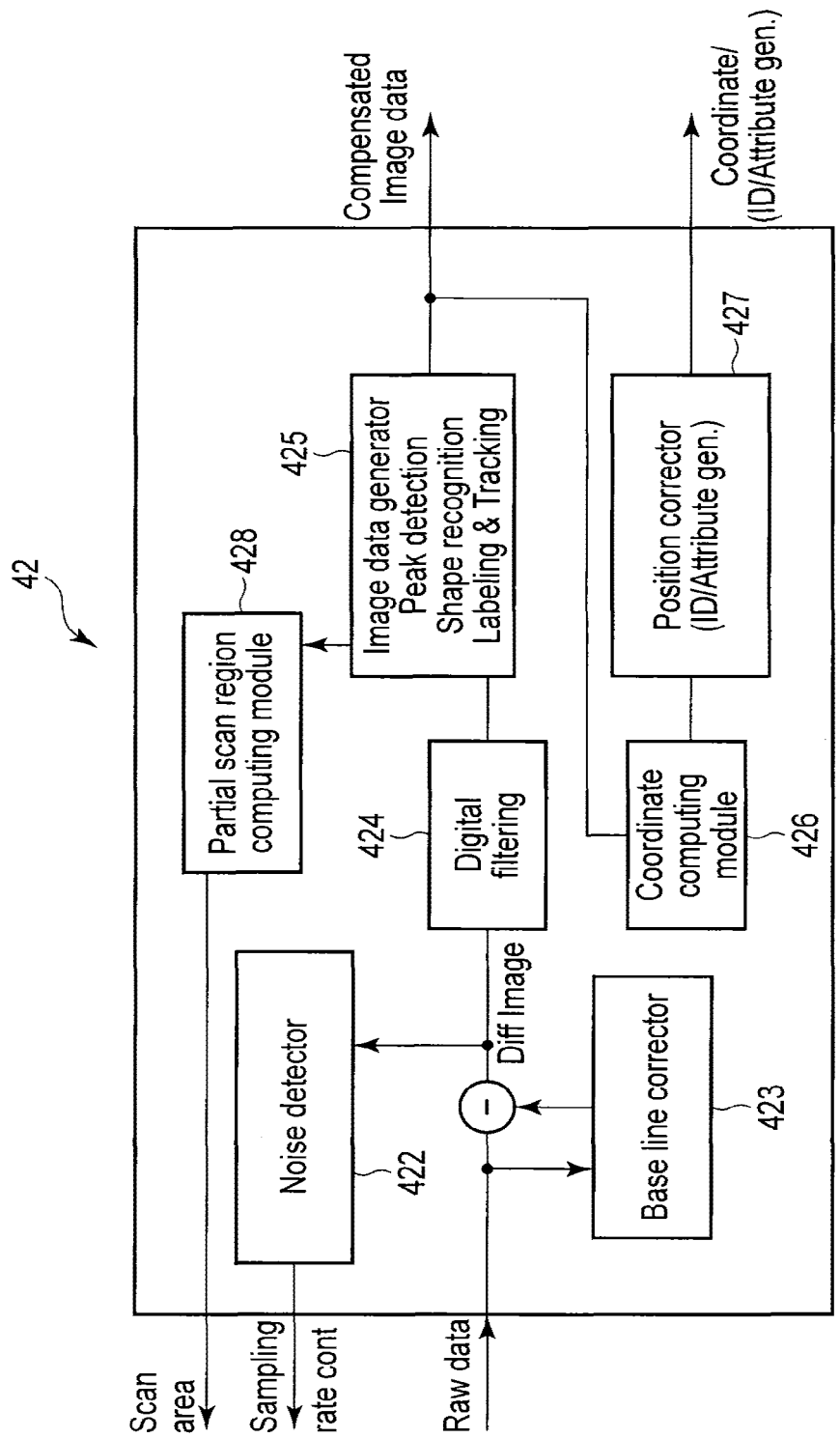
FIG. 5 is a block diagram schematically showing a structural example of a data processor of an application processor in the electronic apparatus shown in FIG. 1.

FIG. 5 is a block diagram schematically showing a structural example of the data processor 42 of the application processor 40 in the electronic apparatus shown in FIG. 1.

The data processor 42 comprises a noise detector 422, a base line corrector 423, a filter 424, an image data generator 425, a coordinate computing module 426, a position corrector 427, and a partial scan region computing module 428.

The base line corrector 423 obtains base line data from the raw data (Raw data) received from the detecting circuit 20. The base line indicates the raw data (Raw data) received from the detecting circuit 20 in a state in which the finger is not present. The base line value is slowly varied as the time elapses and needs to be obtained periodically. In the base line corrector 423, the base line value is computed and output while detecting the state in which the finger is not present. The base line value output from the base line corrector 423 is input to a differentiator. The differentiator outputs a difference obtained by subtracting the base line value from the raw data (Raw data).

The noise detector 422 receives corrected raw data (Raw data) output from the differentiator and detects a noise component in the corrected raw data (Raw data). The noise component is generated depending on, for example, a sampling frequency in the detecting circuit 20. The noise detector 422 outputs a sampling rate control signal (Sampling rate cont.) to adjust the sampling frequency in the detecting circuit 20, and controls the detecting circuit 20 such that the noise component is not included in the raw data (Raw data).

The filter 424 receives the corrected raw data (Raw data) output from the differentiator. The filter 424 removes the noise component from the corrected raw data (Raw data) and outputs the data to the image data generator 425.

The image data generator 425 receives the corrected raw data (Raw data) from the filter 424, and executes peak value detection and shape recognition. The image data generator 425 may generate, for example, three-dimensional image data, and may execute the peak value detection and shape recognition, etc. for the generated three-dimensional image data. After executing the peak value detection and shape recognition, etc., the image data generator 425 can further attach a label which enables an attribute and a type of the corrected raw data (Raw data) to be identified to the image data or can track, for example, a predetermined detection value of the peak value, etc. and detect a locus of the predetermined detection value. The image data generator 425 outputs three-dimensional image data based on the corrected raw data (Raw data), and outputs the label attached to the image data and the locus data of the predetermined value as needed.

The coordinate computing module 426 receives the three-dimensional image data based on the corrected raw data (Raw data), computes coordinates of the position of the user's fingertip, the tip of the stylus, etc. from the received three-dimensional image data and outputs the coordinates.

The position corrector 427 receives the coordinate value output from the coordinate computing module 426 and corrects the received value. The position corrector 427 corrects, for example, the coordinate value computed by the coordinate computing module 426 by referring to a table preset for each user and outputs the corrected coordinate value to the Gesture generator 46 and the software module 48.

The partial scan region computing module 428 receives the image data based on the corrected raw data (Raw data) from the image data generator 425, and computes a region where partial scan should be executed. For example, when the image data includes a peak value which does not exceed a threshold value on whether the user's fingertip or the tip of the stylus is in contact or not (or in proximity or not) or a peak value which is detected in the electrode patterns in the number equal to or less than a predetermined number, of columns, and in the number equal to or less than a predetermined number, of rows, the partial scan region computing module 428 sets a scan area such that partial scanning is executed at positions where these peak values are present, and outputs the scan line signal.

At this time, the partial scan region computing module 428 may output the drive unit (one or more lines) of the electrode pattern of the common electrode CE together and may output the thinning interval (one or more lines) of the electrode pattern of the common electrode CE together, as the scan line signal, upon executing the partial scan.

The partial scan region computing module 428 may be configured to output the scan area and the drive unit or the thinning interval to the other block of the data processor 42, as needed.

Next, an example of an operation of the electronic apparatus according to the present embodiment will be described with reference to the accompanying drawings.

Figure 6:
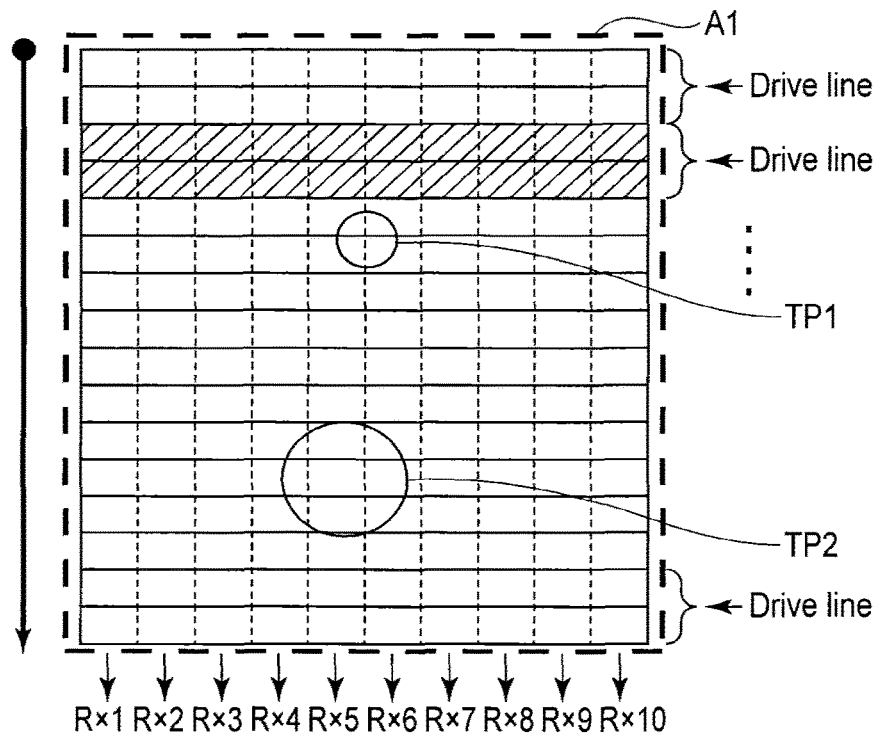
FIG. 6 is a graph illustrating an example of a method of controlling an electronic apparatus according to the embodiment.

FIG. 6 is a graph illustrating an example of a method of controlling the electronic apparatus according to the embodiment. Scanning a region A1 in which the electrode pattern of the common electrode CE is arranged in sixteen lines and the electrode pattern of the detecting electrode SE is arranged in ten columns will be described here.

The display driver 30 outputs the sensor drive signal Tx in accordance with the sensor drive timing signal EXVCOM received from the detecting circuit 20, and outputs the driving electrode signal TA in accordance with the scan line signal (Scan line). In this example, the driving electrode signal TA sets application timing of the sensor drive signal Tx such that the sensor drive signal Tx is sequentially applied by unit of two-line electrode patterns (two drive lines).

In the sensor-equipped display device 10, the sensor drive signal Tx received from the display driver 30 is supplied to the electrode pattern corresponding to the common electrode CE, in accordance with the driving electrode signal TA. Thus, the sensor drive signal Tx is supplied by unit of the two-line electrode patterns, to the common electrode CE, and the region A1 is scanned.

Detection values Rx (Rx1-Rx10) of the detecting electrode SE in ten columns are detected by the detecting circuit 20, at timing at which the sensor drive signal Tx is applied by unit of electrode pattern.

The detecting circuit 20 processes the detection values Rx to the raw data (Raw data) and outputs the raw data (Raw data) to the data processor 42. The data processor 42 generates three-dimensional image data from the received raw data (Raw data) and computes a region where partial scanning should be executed in the partial scan region computing module 428.

In the region A1, the user's fingertip, the tip of the stylus, etc. are in contact with contact regions TP1 and TP2. When the image data includes a peak value which does not exceed a threshold value on whether the user's fingertip or the tip of the stylus is in contact or not (or in proximity or not) or a peak value which is detected in the electrode patterns in the number equal to or less than a predetermined number, of columns, and in the number equal to or less than a predetermined number, of rows, the partial scan region computing module 428 sets the scan area such that partial scanning is executed at positions where these peak values are present, and outputs the scan line signal.

In the example shown in FIG. 6, the contact region TP2 is positioned over the electrode pattern in two drive lines× three columns, and the contact region TP1 is positioned over the electrode edge in one drive line×two columns. In the contact region TP1, the contact region on the sensor is small and coordinate computation of high accuracy is often difficult.

For example, when the peak values are obtained in the regions of the lines equal to or less than a predetermined number of drive lines and the columns equal to or less than a predetermined number of electrode pattern columns, on the sensor, the partial scan region computing module 428 discriminates that the coordinate computation of high accuracy is difficult.

When the partial scan region computing module 428 discriminates that the coordinate computation of high accuracy in the contact region TP1 is difficult, a region including the contact region TP1 is handed as the partial scan region. At this time, the partial scan region is, desirably, large enough to include a region where the contact region TP1 on the sensor is located, and the number of the drive lines to execute the partial scanning is, desirably, smaller than the number of the drive lines at the initial scanning.

Figure 7:
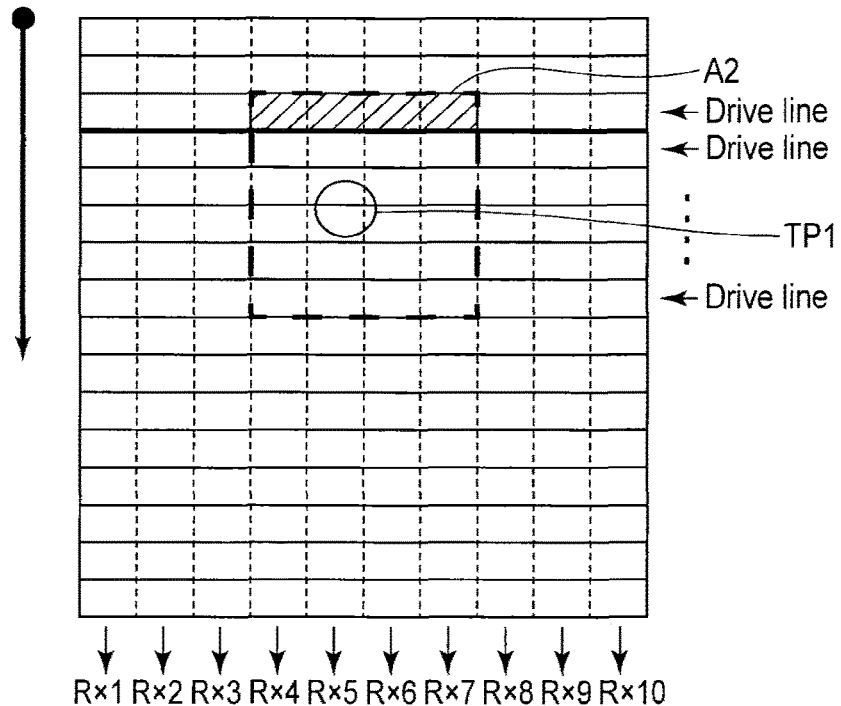
FIG. 7 is a graph illustrating an example of a method of controlling an electronic apparatus according to the embodiment.

FIG. 7 is a graph illustrating an example of a method of controlling the electronic apparatus according to the embodiment. Scanning a region A2 in which the electrode pattern of the common electrode CE in six lines and the electrode pattern of the detecting electrode SE in four columns in the region A1 shown in FIG. 6 intersect each other will be described here.

In this case, the partial scan region computing module 428 outputs a scan area signal including, for example, positional information of diagonal coordinates, etc. corresponding to the region A2, the number of driving electrode patterns (drive lines) or the number of thinning electrode lines.

The timing controller TCON of the detecting circuit 20 outputs a scan line signal (Scan line) indicating a drive line position based on the scan area signal received from the partial scan region computing module 428. The scan line signal (Scan line) includes information such as an identification value of a driving electrode pattern (drive line), of electrode patterns of the common electrode CE, and drive units (one or more lines) or thinning intervals (one or more lines).

The display driver 30 outputs the sensor drive signal Tx in accordance with the sensor drive timing signal EXVCOM received from the detecting circuit 20 and outputs the driving electrode signal TA in accordance with the scan line signal (Scan line). In this example, the driving electrode signal TA sets application timing of the sensor drive signal Tx such that the sensor drive signal Tx is sequentially applied by unit of one-line electrode pattern (one drive line), in the electrode pattern arranged in the region A2.

In the sensor-equipped display device 10, the sensor drive signal Tx received from the display driver 30 is supplied to the electrode pattern corresponding to the common electrode CE, in accordance with the driving electrode signal TA. Thus, the sensor drive signal Tx is sequentially supplied by unit of the one-line electrode pattern, to the common electrode CE, in the electrode pattern arranged in the region A2, and the region A2 is scanned.

Detection values Rx (Rx1-Rx10) of the detecting electrode SE in ten columns are detected by the detecting circuit 20, at timing at which the sensor drive signal Tx is applied by unit of electrode pattern in the region A2.

The detecting circuit 20 processes the detection values Rx to the raw data (Raw data) and outputs the raw data (Raw data) to the data processor 42. The data processor 42 generates three-dimensional image data from the received raw data (Raw data) and executes various types of computation.

As described above, when the application processor 40 discriminates that computation of high accuracy based on the raw data (Raw data) is difficult, various types of computation at the application processor 40 can be implemented at higher accuracy by executing the partial scanning and obtaining a sensor detection value of higher accuracy, and user's convenience can be enhanced.

In addition, in the present embodiment, since the application processor 40 controls the sampling rate at the detecting circuit 20 and controls the sensor driving operation and transmits graphic data (Graphic) to the display driver 30, the displaying operation and the detecting operation can be executed synchronously with each other and feedback of the sensor input to the display can be executed smoothly. In this case, the memory 36 of the display driver 30 needs only to have a capacity of a line memory, and a large-capacity memory is not required.

Furthermore, in the present embodiment, since the computation based on the sensor detection value can be executed at a high speed in the application processor 40, the time to update image display on the display device can be shortened in accordance with the detection result at the sensor. The user can therefore operate the electronic apparatus without uncomfortable feeling caused by a time lag from input to update image display.

According to the electronic apparatus and the method of controlling the electronic apparatus, of the present embodiment, delay in the image display and operation errors can be suppressed since the synthesis of the sensor with the display device can be controlled by the application processor 40.

In the present embodiment, the configuration of the application processor 40 may be implemented by hardware or software. In either case, the configuration of the display device 10, the detecting circuit 20 and the display driver 30 does not become complicated since the display driver 30 and the detecting circuit 20 are controlled and the computation using the raw data is executed in the application processor 40. In other words, the electronic apparatus and the method of controlling the electronic apparatus, having high general versatility, can be provided according to the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The scan area signal output from the application processor 40 is input to the detecting circuit 20 in the above descriptions, but may be input from the application processor 40 to the display driver 30 via an interface arranged between the application processor 40 and the display driver 30. In this case, the sensor drive signal distributing circuit 32 receives the scan area signal, and outputs the driving electrode signal TA that sets the number of drive lines and the pattern electrode to apply the sensor drive signal Tx in accordance with the scan area signal.

In the above descriptions, when the partial scanning is executed, the sensor detection values Rx for all of the electrode patterns are detected by the detecting circuit 20 and output to the application processor 40 as the raw data. However, a necessary detection value alone of the electrode pattern may be obtained, processed as the raw data and output in the detecting circuit 20, and necessary data alone may be used in the application processor 40.

The sensor-equipped display device is configured to comprise the liquid crystal display device as the display device in the above descriptions, but may be configured to comprise the other display device such as an organic electroluminescent display device. In the example shown in FIG. 2, the liquid crystal display device is configured to comprise both the pixel electrode PE and the common electrode CE arranged on the array substrate AR, i.e., to mainly use the lateral electric field (and the fringe field) of the In-Plane Switching (IPS) mode, Fringe Field Switching (FFS) mode, etc., but the configuration of the liquid crystal display device is not limited to this. At least the pixel electrode PE may be provided on the array substrate AR, and the common electrode CE may be provided on either the array substrate AR or the counter-substrate CT. When the longitudinal electric field of Twisted Nematic (TN) mode, Optically Compensated Bend (OCB) mode, Vertical Aligned (VA) mode, etc. is mainly employed, the common electrode CE is provided on the counter-substrate CT. In other words, the common electrode CE may be arranged between an insulating substrate which constitutes the TFT substrate 12 and an insulating substrate 14 which constitutes the counter-substrate CT.

The names of the blocks and components are not limited to those described above, nor are the units thereof. The blocks and components can be shown in a combined manner or in smaller units. The term "unit" may be replaced by terms such as "device", "section", "block", and "module". Even if the terms are changed, they naturally fall within the scope of the present disclosure. Further, structural elements in the claims that are expressed in a different way, such as in a divided manner or in a combined manner, still fall within the scope of the present disclosure.

What is claimed is:

1. An electronic apparatus comprising:
a sensor configured to output data corresponding to detection of a contact or proximate position, the sensor including a plurality of drive lines and a plurality of detection electrodes;
a driver configured to perform a first scan by driving a first number of drive lines in total;
a detecting circuit configured to perform the first scan by receiving data from a second number of detection electrodes; and
a determining circuit configured to determine a region including data whose value is greater than a first threshold based on the data from the first scan, and determine whether a size of the region is not greater than a second threshold, wherein
the driver is further configured to perform a second scan in the region by driving a third number of drive lines in total when the size of the region is not greater than the second threshold, the first number being, greater than the third number, and
the detecting circuit is further configured to perform the second scan by receiving data from a fourth number of detection electrodes, the second number being greater than the fourth number.

2. The electronic apparatus according to claim 1, wherein the detecting circuit is configured to perform the first scan by receiving data from each of the detection electrodes, and
the determining circuit is configured to determine that the size of the region is not greater than the second threshold when a number of detection electrodes whose data has values greater than the first threshold is less than or equal to a predetermined number.

3. The electronic apparatus according to claim 1, wherein the data is three-dimensional data including coordinates of a position and a physical quantity at that position.

4. The electronic apparatus according to claim 3, further comprising a circuit for attaching a label which is configured to enable at least one of an attribute and a type of the three-dimensional data to be identified based on the three-dimensional data.

5. The electronic apparatus according to claim 1, wherein the driver is configured to:
perform the first scan by driving a fifth number of drive lines at a timer; and
perform the second scan by driving a sixth number of drive lines at a time,
the fifth number being greater than the sixth number.

6. A method of controlling an electronic apparatus comprising a sensor, a driver, a detecting circuit, and a determining circuit, the method comprising:
outputting, by the sensor, data corresponding to detection of a contact or proximate position, the sensor including a plurality of drive lines and a plurality of detection electrodes:
performing a first scan, including
driving, by the driver, a first number of drive lines in total, and
receiving, by the detecting circuit, data from a second number of detection electrodes;
determining, by the determining circuit, a region including data whose value is greater than a first threshold based on the data from the first scan, and whether a size of the region is not greater than a second threshold; and
performing a second scan in the region when the size of the region is not greater than the second threshold, the second scan including
driving, by the driver, a third number of drive lines in total, the first number being greater than the third number, and
receiving, by the detecting circuit, data from a fourth number of detection electrodes, the second number being greater than the fourth number.

7. The method according to claim 6, wherein
performing the first scan further comprises receiving, by the detecting circuit, data from each of the detection electrodes, and
determining whether the size of the region is not greater than the second threshold comprises determining, by the determining circuit, that the size of the region is not greater than the second threshold when a number of detection electrodes whose data has values greater than the first threshold is less than or equal to a predetermined number.

8. The method, according to claim 6, wherein the data is three-dimensional data including coordinates of a position and a physical quantity at that position.

9. The method according to claim 8, further comprising attaching a label which enables at least one of an attribute and a type of the three-dimensional data to be identified based on the three-dimensional data.

10. The method according to claim 6, wherein
performing the first scan includes driving a fifth number of drive lines at a time,
performing the second scan includes driving a sixth number of drive lines at a time, and
the fifth number is greater than the sixth number.

11. An electronic apparatus comprising:
a display device;
a sensor configured to output data corresponding to detection of a contact or proximate position on the display device, the sensor including a plurality of drive lines and a plurality of detection electrodes;
a driver configured to
output an image display signal to the display device, and
perform a first scan by driving a first number of drive lines in total;
a detecting circuit configured to perform the first scan by receiving data from a second number of detection electrodes; and
a determining circuit configured to determine a region including data whose value is greater than a first threshold based on the data from the first scan, and determine whether a size of the region is not greater than a second threshold, wherein
the driver is further configured to perform a second scan in the region by driving a third number of drive lines in total when the size of the region is not greater than the second threshold, the first number being greater than the third number, and
the detecting circuit is further configured to perform the second scan by receiving data from a fourth number of detection electrodes, the second number being greater than the fourth number.

12. The electronic apparatus according to claim 11, wherein
the detecting circuit is configured to perform the first scan by receiving data from each of the detection electrodes, and
the determining circuit is configured to determine that the size of the region is not greater than the second threshold when a number of detection electrodes whose data has values greater than the first threshold is less than or equal to a predetermined number.

13. The electronic apparatus according to claim 11, wherein
the display device comprises a plurality of display electrodes for displaying an image on the display device, and
a part of the plurality of display electrodes is configured to function as a part of the plurality of detection electrodes.

14. The electronic apparatus according to claim 11, wherein an operation of outputting the image display signal to the display device and an operation of driving the first number of drive lines or driving the third number of drive lines are performed by time-sharing.

15. The electronic apparatus according to claim 11, wherein the data is three-dimensional data including coordinates of a position and a physical quantity at that position.

16. The electronic apparatus according to claim 15, further comprising a circuit for attaching a label which is configured to enable at least one of an attribute and a type of the three-dimensional data to be identified based on the three-dimensional data.

17. The electronic apparatus according to claim 11, wherein the driver is configured to:
perform the first scan by driving a fifth number of drive lines at a time; and
perform the second scan by driving a sixth number of drive lines at a time,
the fifth number being greater than the sixth number.

* * * * *